US012290962B2

(12) United States Patent
Fratto et al.

(10) Patent No.: US 12,290,962 B2
(45) Date of Patent: May 6, 2025

(54) APPARATUS AND PROCESS FOR MIXING GRANULES AND/OR POWDERS AND/OR LIQUIDS IN RUBBER PRODUCTION PLANTS

(71) Applicant: NTE HOLDING S.R.L., Gorgonzola (IT)

(72) Inventors: Emanuele Fratto, Catanzaro (IT); Massimo Congedi, Milan (IT); Fabio Novelli, Gorgonzola (IT)

(73) Assignee: NTE HOLDING S.R.L., Gorgonzola (IT)

( * ) Notice: Subject to any disclaimer, the term of this patent is extended or adjusted under 35 U.S.C. 154(b) by 160 days.

(21) Appl. No.: 17/622,361

(22) PCT Filed: Jun. 24, 2020

(86) PCT No.: PCT/IB2020/055972
§ 371 (c)(1),
(2) Date: Dec. 23, 2021

(87) PCT Pub. No.: WO2020/261143
PCT Pub. Date: Dec. 30, 2020

(65) Prior Publication Data
US 2022/0250281 A1    Aug. 11, 2022

(30) Foreign Application Priority Data

Jun. 26, 2019    (IT) .................. 102019000010080

(51) Int. Cl.
*B29B 7/00* (2006.01)
*B01F 23/00* (2022.01)
(Continued)

(52) U.S. Cl.
CPC ............ *B29B 7/7485* (2013.01); *B29B 7/007* (2013.01); *B29B 7/603* (2013.01); *B29B 7/7461* (2013.01);
(Continued)

(58) Field of Classification Search
None
See application file for complete search history.

(56) References Cited

U.S. PATENT DOCUMENTS 3,048,559 A * 8/1962 Heller ...................... B29B 7/16
523/318
3,417,960 A * 12/1968 Stehlin .................. F16K 31/143
251/14

(Continued)

FOREIGN PATENT DOCUMENTS

CH            679564 A5    3/1992
CN         101671412 A    3/2010
(Continued)

OTHER PUBLICATIONS

Mohankpvk. "What Is the Difference Between Nozzle (or a Ventury) and Flow Control Valve?" Physics Forums | Science Articles, Homework Help, Discussion, Jul. 18, 2018, www.physicsforums.com/threads/what-is-the-difference-between-nozzle-or-a-ventury-and-flow-control-valve.951693. (Year: 2018).*

(Continued)

*Primary Examiner* — Alison L Hindenlang
*Assistant Examiner* — Andres E. Behrens, Jr.
(74) *Attorney, Agent, or Firm* — SHUTTLEWORTH & INGERSOLL, PLC; Timothy J. Klima

(57) ABSTRACT

An apparatus and process or mixing granules and/or powders and/or liquids in rubber production plants, including: a mixer/extruder device for the production of a basic heterogeneous mixture; a plurality of distribution lines associated
(Continued)

with said mixer/extruder device to supply the device itself with respective powdered and/or granulated and/or liquid products; the mixer/extruder device mixing the powdered and/or granulated and/or liquid products to obtain said heterogeneous mixture; at least one distribution line of a powdered product includes a pre-mixer arranged upstream of said mixer/extruder device to pre-mix said powdered product with at least one liquid product, preferably oil.

13 Claims, 2 Drawing Sheets

(51) Int. Cl.
| | | |
|---|---|---|
| *B01F 23/20* | (2022.01) | |
| *B01F 23/21* | (2022.01) | |
| *B01F 23/23* | (2022.01) | |
| *B01F 23/231* | (2022.01) | |
| *B29B 7/60* | (2006.01) | |
| *B29B 7/74* | (2006.01) | |
| *B29B 7/94* | (2006.01) | |
| *B29C 48/00* | (2019.01) | |
| *B29C 48/28* | (2019.01) | |
| *B29C 48/285* | (2019.01) | |
| *B29C 48/29* | (2019.01) | |
| *B29C 48/92* | (2019.01) | |
| *B65D 88/00* | (2006.01) | |
| *B65D 88/70* | (2006.01) | |

(52) U.S. Cl.
CPC .............. *B29B 7/7495* (2013.01); *B29B 7/94* (2013.01); *B29C 48/286* (2019.02); *B29C 48/288* (2019.02); *B29C 48/29* (2019.02); *B29C 48/92* (2019.02); *B29C 2948/926* (2019.02)

(56) References Cited

U.S. PATENT DOCUMENTS

| | | | | |
|---|---|---|---|---|
| 3,597,850 A * | 8/1971 | Jenkins | .................. | F26B 17/128 34/361 |
| 3,647,188 A * | 3/1972 | Solt | ................... | B01F 33/40512 366/173.1 |
| 3,788,527 A * | 1/1974 | Matson | ................ | B65D 88/703 406/137 |
| 3,949,963 A * | 4/1976 | Aoki | ........................ | F16K 43/00 137/554 |
| 4,261,389 A * | 4/1981 | Hager | ..................... | F16K 47/04 251/332 |
| 4,300,750 A * | 11/1981 | Valka | ................... | F16K 37/0066 251/333 |
| 4,325,495 A * | 4/1982 | Mokris | ................ | B65D 88/703 222/1 |
| 4,739,964 A * | 4/1988 | Hutt | ..................... | B65D 88/706 366/101 |
| 4,887,773 A * | 12/1989 | Mehltretter | ........... | F27D 3/0033 241/176 |
| 5,017,053 A * | 5/1991 | Sisk | ....................... | B01F 33/406 406/137 |
| 5,609,831 A * | 3/1997 | Kempter | ............... | B01F 35/323 422/135 |
| 6,007,234 A * | 12/1999 | Steele | ................... | B65D 88/706 239/533.14 |
| 6,068,238 A * | 5/2000 | Frank | ................... | F16K 31/1221 251/63.6 |
| 6,601,823 B2 * | 8/2003 | Newberg | ............... | F16K 41/103 251/339 |
| 7,267,475 B2 * | 9/2007 | Steele | ..................... | B01F 23/60 366/101 |
| 9,541,201 B2 * | 1/2017 | Frank | ......................... | F16K 1/38 |
| 11,325,082 B2 * | 5/2022 | Congedi | ............. | B01F 33/4062 |
| 2002/0038582 A1 | 4/2002 | Holl | | |
| 2004/0233776 A1 * | 11/2004 | Steele | .................. | B01F 33/4062 366/106 |
| 2015/0194653 A1 * | 7/2015 | Waterhouse | ........... | B29B 7/7495 264/211 |
| 2016/0288368 A1 * | 10/2016 | Orban | .................... | B01F 25/721 |
| 2017/0066589 A1 * | 3/2017 | Tiffany, III | ......... | F16K 31/1221 |
| 2020/0129940 A1 * | 4/2020 | Congedi | ................. | B01F 23/60 |

FOREIGN PATENT DOCUMENTS

| | | |
|---|---|---|
| EP | 0309409 A2 | 3/1989 |
| EP | 0775718 A2 | 5/1997 |
| JP | H05329835 A | 12/1993 |
| WO | 2019003027 A1 | 1/2019 |
| WO | 2021240555 A1 | 12/2021 |

OTHER PUBLICATIONS

International Search Report and Written Opinion dated Sep. 18, 2020 from counterpart International Patent Application No. PCT/IB2020/055972.

European Office Action dated Dec. 19, 2022 from counterpart European Patent Application No. 20740402.1.

* cited by examiner

APPARATUS AND PROCESS FOR MIXING GRANULES AND/OR POWDERS AND/OR LIQUIDS IN RUBBER PRODUCTION PLANTS

This application is the National Phase of International Application PCT/IB2020/055972 filed Jun. 24, 2020 which designated the U.S.

This application claims priority to Italian Patent Application No. 102019000010080 filed Jun. 26, 2019, which application is incorporated by reference herein.

The present invention relates to an apparatus and relative process for mixing granules and/or powders and/or liquids in rubber production plants.

In particular, the present invention relates to an apparatus and a method for forming a heterogeneous mixture which is used as a base for the production of rubber in the automotive sector, in particular in the production of tyres, or other related technical sectors.

As is known, in the context of rubber production, materials in powdered form are supplied to respective mixing containers/extruders called "mixers" within which the aforementioned heterogeneous mixture is made.

Such powdered materials, mostly consisting of carbon black, silica and other minor additives such as resins, zinc, clays, stearic acid, are distributed together with oils in pre-dosed quantities through suitable pneumatic supply ducts to the mixer.

In addition, rubber is introduced into the mixer in pieces, obtained for example from the shearing of the rubber obtained from previous processes, to be combined with the powders and oils.

In this situation, the components described above are mixed together inside the mixer and extruded in order to obtain the aforementioned heterogeneous mixture that forms the rubber base.

As described above, all the components are directly introduced into the mixer/extruder and only in this step mixed together.

However, this solution has considerable drawbacks, mainly due to the difficulty of handling very fine powders.

It should be noted that the smaller particles of carbon black, silica and other powdered compounds are difficult to control within the pneumatic supply systems. This entails a major drawback in terms of the amount of material (fine powders) that remains in the systems without being properly supplied to the mixer.

A further major drawback of the known systems is due to the difficulty of mixing all the material to be treated inside the mixer. This drawback occurs because the liquid products (oils) which are delivered in the mixer do not always manage to cover the entire quantity of powdered material. In these cases, in fact, the powders tend to aggregate, thus making it more difficult to properly disperse the oil in a uniform manner.

In this context, the technical task underlying the present invention is to propose an apparatus and relative process for mixing granules and/or powders and/or liquids in rubber production plants, which overcome the drawbacks of the above-mentioned prior art.

In particular, an object of the present invention is to provide an apparatus and relative process capable of dispersing the oils inside the mixer in a more uniform manner, and reducing the dustiness of the components.

In greater detail, the object of the present invention is to provide an apparatus and relative method capable of further aggregating the fine powders before they are mixed with other components, so as to also supply the smallest particles to the mixer.

Furthermore, an object of the present invention is to provide a method for further homogenizing all the components inside the mixer.

The outlined technical task and the specified object are basically achieved by an apparatus and relative process for mixing granules and/or powders and/or liquids in rubber production plants, comprising the technical specifications set out in one or more of the appended claims.

Further characteristics and advantages of the present invention will become more apparent from the illustrative, yet non-limiting, description of a preferred, albeit not exclusive, embodiment of an apparatus and relative process for mixing granules and/or powders and/or liquids in rubber production plants, as illustrated in the appended figures, in which.

With reference to the appended figures, reference number 1 globally indicates an apparatus for mixing granules and/or powders and/or liquids in rubber production plants according to the present invention.

It should be specified that the present invention finds advantageous application in the rubber production plants used in the automotive sector, in particular for the production of road tyres. However, the invention can be used in rubber production plants used in various fields, where it is necessary to optimize the distribution and mixing processes of powdered components which are mixed in a heterogeneous compound used as a base in rubber production.

Figure 1:
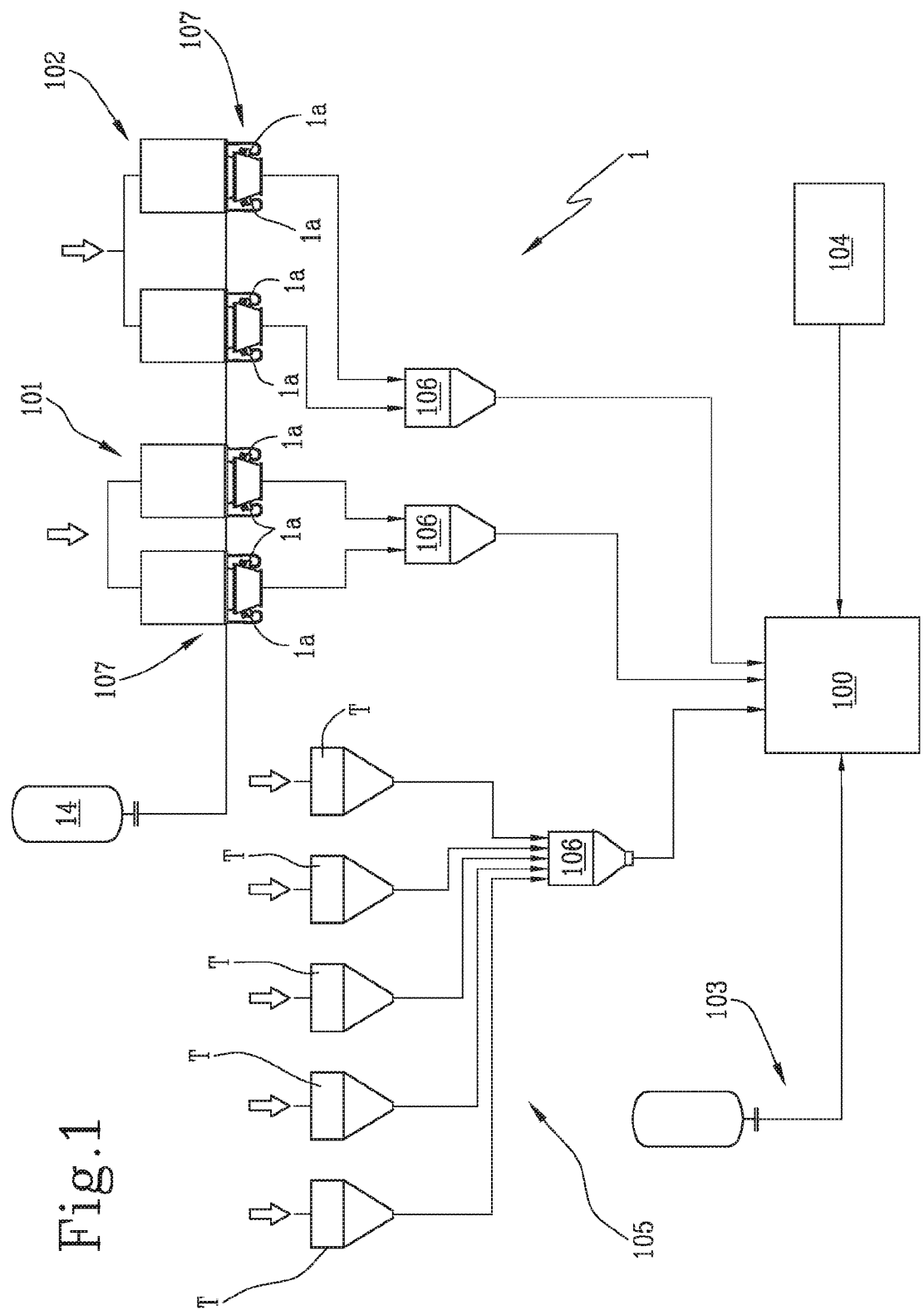
FIG. 1 shows a typical schematic view of an apparatus for mixing granules and/or powders and/or liquids in rubber production plants.

More specifically, the apparatus 1 which is schematically shown in FIG. 1 comprises a mixer/extruder device 100 for the production of the aforementioned basic heterogeneous mixture.

A plurality of distribution lines 101, 102, 103, 104, 105 are associated with said mixer/extruder device 100 to supply the device 100 itself with respective powdered and/or granulated and/or liquid products.

In this way, the mixer/extruder device 100, which is not described in detail as it is of known type, mixes the powdered and/or granulated and/or liquid products together to obtain said heterogeneous mixture which is then extruded from the device 100 itself.

The heterogeneous mixture exiting the device 100 is then supplied to a subsequent production line (not illustrated, as it is not part of the present invention) adapted to rubber production.

Preferably, in accordance with the preferred but non-limiting embodiment of the present invention illustrated in FIG. 1, two supply lines are provided of respective powdered products 101, 102, at least one supply line of a liquid product 103, at least one supply line of a product in pieces 104, and at least one supply line of further additives 105 which may be in powdered, granular or liquid form.

In particular, a first supply line 101 provides for the distribution of powdered carbon black, and comprises a series of hoppers "T" to which the product is supplied by means of known supply sources of this material which are not illustrated.

A second supply line 102 provides for the distribution of powdered silica, and comprises a series of hoppers "T" also adapted to receive the powdered product from further supply sources not illustrated.

The supply line of the additives 105 has a series of hoppers "T", each of which is dedicated to the containment and distribution of such chemical additives, generically referred to as chemicals, which may be for example zinc, stearic acid, resins, clay and stearic acid.

In FIG. 1, five hoppers "T" for the above-mentioned chemical additives are illustrated. It should however be noted that the number of hoppers "T" and additives can be different according to the various production needs.

The supply line of the liquid product 103 comprises an oil tank, which is supplied directly to the device 100.

The supply line of the product in pieces 04 instead comprises a series of shearing devices, also not illustrated as they do not form a part of the present invention, which provide for fragmenting portions of rubber. The rubber in pieces is then supplied inside the mixer/extruder by means of suitable supply systems such as conveyor belts.

The supply lines 101, 102, 103, 104 and 105 are also equipped with suitable dosing members indicated by way of example with the reference number 106 in FIG. 1, suitably formed according to the nature of the product to be dosed to the device 100.

The dosing device 106 provides for delivering dosed parts of the respective products to the aforementioned mixer/extruder device 100 according to the various production and operating needs of the apparatus 1.

Advantageously, at least one distribution line of the powdered product 101, 102 comprises a pre-mixer 107 arranged upstream of the mixer/extruder device 100 to mix said powdered product with at least one liquid product. In this manner, the pre-mixer 107 provides for preparing a mixture of powdered and liquid product which is sent directly to the device 100.

In particular, the pre-mixer 107 is provided for the first supply line 101 of powdered carbon black. Advantageously, also the second supply line 102 of powdered silica can also be provided, as indicated in FIG. 1, with the aforementioned pre-mixer 107.

Figure 2:
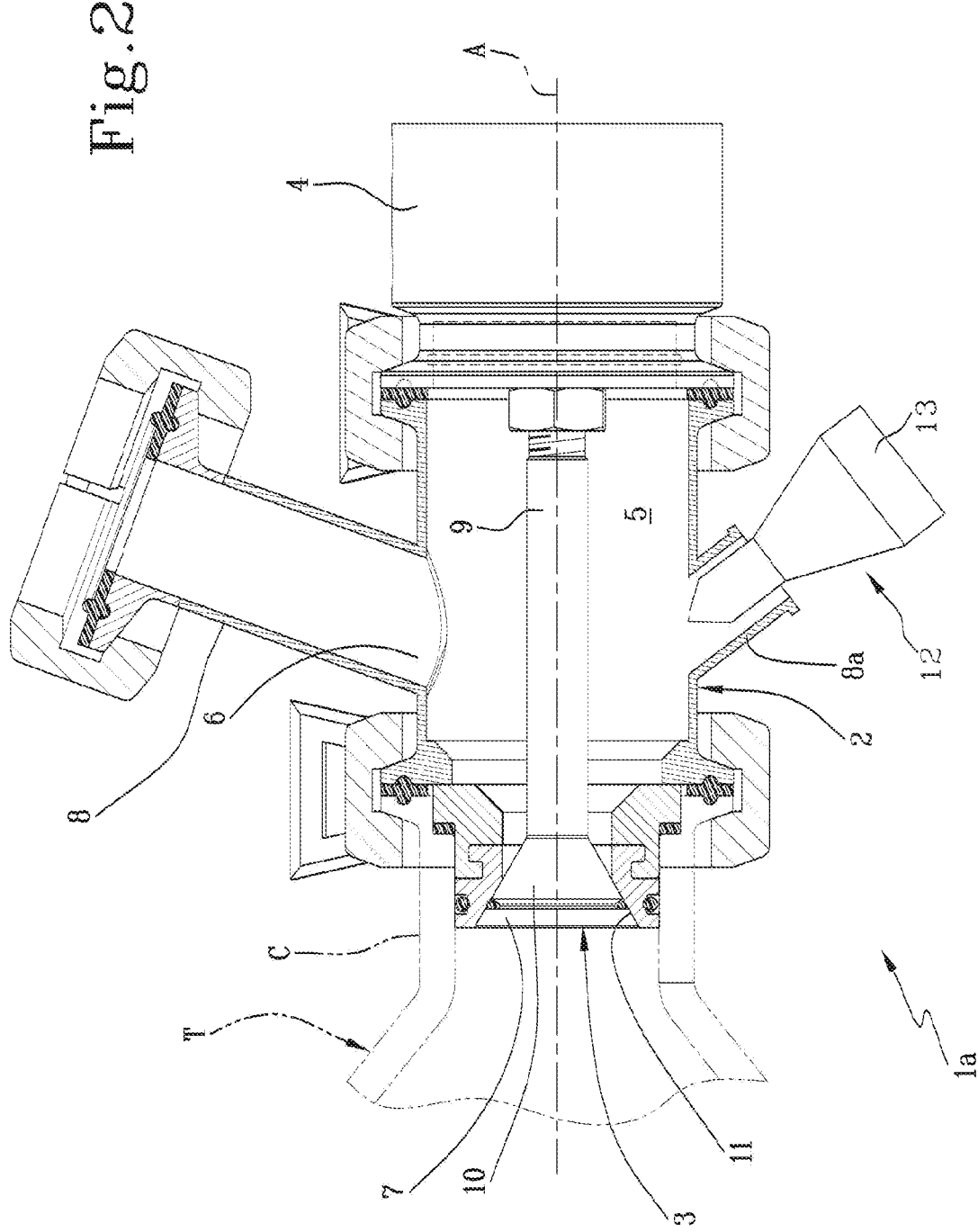
FIG. 2 is a longitudinal sectional view of a constructive detail of a mixer inserted in the apparatus according to the present invention.

In greater detail, the pre-mixer 107 comprises the hopper "T" for containing powdered products, having on the respective outer surface at least one manifold defining a respective duct "C" in fluid communication with the inside of the hopper "T" (FIG. 2).

At least one blower member 1a adapted to deliver a mixing flow of the powders inside the hopper "T" is associated with the duct "C".

Referring only to FIG. 2, the main components of the member 1a are: a hollow element 2, a shutter 3 and an actuator 4 associated with the shutter 3 to adjust the position thereof, that is, to adjust the maximum stroke thereof, understood as moving from a closed condition of the shutter to a maximum opening position which can be predefined, as better specified below.

The hollow element 2, preferably with a monolithic structure, is a body internally defining a manoeuvring volume for the housing of the shutter 3 and the passage of the mixing gas flow. In particular, the hollow element 2 defines therein a duct 5 configured to pass a flow of gas or other inert gases between an inlet section 6 and an outlet section 7.

The shutter 3 is contained in the body 2 to move along a translation axis "A" thereof.

The blower member 1a further comprises a lateral supply duct 8 which defines the inlet section 6 and flows into the chamber 5 in a direction preferably incident to the translation axis "A" of the shutter 3.

The chamber 5 extends between a rear region of the hollow element 2, to which the actuator 4 is applied, and the aforementioned outlet section 7.

With reference to the shutter 3, it has the shape of a plunger comprising an elongated stem 9 and a flared or tapered head portion 10, preferably frusto-conical. The shutter 3 is connectable to the actuator 4 and is positionable with the controlled interruption of the gas flow through the outlet section 7.

In particular, a stop element 11, having at least one internal stop surface, is arranged in opposition to the shutter 3. The internal stop surface, preferably frusto-conical or converging, is counter-shaped to the head portion 10 of the shutter 3 to define at least one hermetically sealing configuration of the outlet section 7.

The position of the shutter 3, controlled by the actuator 4, determines the opening and closing of a flow connection between the chamber 5 and the hopper "T" to which the blower member 1a is connected through said duct "C". In addition, the possible intermediate positions of the shutter 3 may determine the size of the flow connection passage section. In particular, the size of the aforementioned section is defined by the position of the head portion 10 of the shutter 3 with respect to the internal stop surface.

Advantageously, in order to be able to determine the intermediate positions of the shutter 3, i.e. the shutter stroke during the opening step, adjustment means are arranged inside the actuator 4 adapted to determine the amplitude of the output section 7.

Such adjustment means may be of a manual type, for a variation of the output section 7 carried out by manual intervention on mechanical parts of the actuator 4, or automatic by means of an appropriate electronic system that intervenes on the actuator 4 under certain conditions.

The adjustment means therefore allow to control the flow with an "additional" parameter with respect to the ON/OFF pressure and time parameters only (opening and closing of the outlet section 7), i.e. a representative control parameter representing the amplitude of the fluid passage section.

Advantageously, this parameter is then controlled (as it is adjusted by manual or automatic intervention) independently of the pressure and opening time parameters of the outlet section 7.

The adjustment means therefore allow to intervene on the parameter representing the amplitude of the passage section by optimizing the flow and adjusting it according to the type of material to be mixed, i.e. according to the chemical nature of the material and the particle size of the powders.

Thus, based on each individual mixing step, the individual flow control parameters are suitably independently adjusted in order to optimally mix the powders.

The respective shapes of the head portion 10 of the shutter 3 and the internal stop surface and the position of the shutter 3 may determine the characteristics of the flow of air flowing into the hopper "T" through the duct "C".

According to a preferred embodiment of the invention, the apparatus 1 comprises a plurality of blowing members 1a of the type described above and associated along a circumferential path at the base of the hopper "T".

In this way, a series of pulsed mixing gas flows are generated according to a predefined sequence in order to implement a turbulent action adapted to homogeneously mix the powders and liquids contained in the hopper "T".

In accordance with a first preferred embodiment of the present invention and illustrated in FIG. 2, the blowing member 1a further comprises an injector 12 for delivering a liquid product directly inside the blowing member 1a itself, preferably a mixing oil with the powder contained in the hopper "T".

In greater detail, as is better illustrated in FIG. 2, the injector comprises an oil supply nozzle 13, engaged in an auxiliary duct 8a of the hollow element 2 extending from the opposite side of the lateral duct 8 and in an incident direction to the translation axis "A" of said shutter.

The injector 12 is associated with a supply source 14 of the oil connected to the nozzle 13 to supply the oil inside the chamber 5.

In this way, the oil is supplied directly to the blower member from the nozzle 13 and conveyed into the hopper "T" by the mixing flow in the form of a nebulized fluid.

As a result, the oil is dispersed in the hopper "T" by means of the vortex flow to significantly reduce the dustiness of the powdered product (typically carbon black or silica) contained in the hopper itself.

In accordance with a further alternative embodiment, the hopper "T" is provided with a nozzle which supplies the liquid product directly into the hopper "T" itself. In this case, the liquid product is distributed on the powders and the gaseous flow generated by the blower member 1a mixes the powders with the oil to obtain the aforementioned mixture.

Preferably, the aforementioned pre-mixer 107 can be used for each hopper "T" adapted for the containment of powdered products. FIG. 1 illustrates, merely by way of example, pre-mixers 107 used for the hoppers "T" of the first and second lines 101, 102 respectively provided for the supply of carbon black and silica.

The present invention also relates to a process for mixing granules and/or powders and/or liquids in rubber production plants, comprising the steps of:
arranging a plurality of supply lines 101, 102, 103, 104, 105 of powdered and/or granulated and/or liquid products;
distributing the products inside a mixer/extruder device 100; and
mixing the products in the mixer/extruder 100 to obtain a basic heterogeneous mixture.

The process further provides, prior to the step of distributing the products in said mixer/extruder device, the step of pre-mixing at least one powdered product with a liquid product.

Preferably, a plurality of pre-mixing steps are provided to supply the mixer/extruder device 100 with a series of powdered and liquid product mixtures.

Each pre-mixing step occurs along at least one respective line 101, 102, supplying a respective powdered product into the hopper "T" and subsequently delivering a mixing flow of the aforementioned powders into the hopper "T".

The supply of the powders into the hopper "T" is carried out using known methods.

The step of delivering the mixing flow is implemented by means of the aforementioned blowing member 1a adapted to generate the flow of fluid inside the hopper.

In addition, the pre-mixing involves the step of injecting the liquid product, an oil as indicated above, in the mixing flow. Such injection is carried out directly into the blower member in order to distribute the liquid product together with the fluid flow. In this way, the liquid product is nebulized and supplied into the hopper "T" together with the flow to promote, in the vortex motion thereof, the aggregation with the powdered particles.

In accordance with an alternative embodiment of the present invention, the oil is supplied directly into the hopper "T" from above and thus onto the powders. In this situation, the mixing action of the fluid flow still allows to mix the powders and the oil, favouring a homogeneous aggregation.

In this manner, the powder and oil product mixture is supplied directly to the mixer/extruder device 100.

The process according to the present invention further provides the steps of supplying oil and sheared rubber directly to the mixer/extruder 100 together with the additives and the aforementioned mixture.

Note that the apparatus 1 and the process described above allow to greatly reduce the dustiness of the powdered products intended to be supplied to the device 100.

In fact, by means of the action of pre-mixing at least one powdered product with the liquid product (oil), it is possible to aggregate the powders, reduce their dustiness, and thus better control the supply into the mixer/extruder device 100.

This results in an optimization in the distribution processes of the products and therefore a reduction in the consumption of the fine powders which in this way are also aggregated and therefore easily moved, and dosed to the device 100.

In addition, the action of the mixing flow allows the oils and powders to be mixed in a more uniform manner in the individual hoppers "T" and also inside the mixer/extruder device 100.

This results in a better homogenization of all the powdered/granular and liquid products inside the device 100.

The invention claimed is:

1. An apparatus for mixing at least one chosen from granules, powders, and liquids in rubber production plants, comprising: —a mixer/extruder device configured for production of a basic heterogeneous mixture; —a plurality of distribution lines operatively connected to said mixer/extruder device to supply the mixer/extruder device with at least one chosen from a powdered product, a granulated product, and a liquid product; —said mixer/extruder device configured for mixing the at least one chosen from the powdered product, the granulated product, and the liquid product to obtain said heterogeneous mixture; wherein at least one of the distribution lines carries the powdered product and includes a pre-mixer arranged upstream of said mixer/extruder device to mix said powdered product with the liquid product to form a mixture; wherein said pre-mixer comprises: —a hopper for containing the powdered product and including on an external surface of the hopper, a manifold defining a respective duct in fluid communication with an interior of the hopper; —a blower member operatively connected with the duct for delivering a mixing flow of the powdered product inside the hopper; said blower member comprising: a hollow element defining a duct to pass a flow of gas between an inlet and an outlet section; a shutter contained in the hollow element and an actuator connected with the shutter to adjust a maximum stroke thereof, the actuator moving the shutter along a translation axis from a closed condition to a maximum opening position along a translation axis thereof; a lateral supply duct defining the inlet section and flowing into a chamber in a direction incident to the translation axis of the shutter; the shutter presenting a shape of a plunger comprising an elongated stem and a frustoconical head portion; a stop element, having at least one frustoconical internal stop surface arranged in opposition to the shutter; the at least one frustoconical internal stop surface being counter-shaped to the head portion of the shutter to define at least one hermetically sealing configuration of the outlet section; and an injector of said liquid product to supply the flow of gas with said liquid product and to make said mixture of liquid product and powder; the injector comprising an oil supply nozzle, engaged in an auxiliary duct of the hollow element extending from an opposite side of the lateral duct and in an incident direction to the translation axis of said shutter.

2. The apparatus according to claim 1, wherein the plurality of distribution lines includes two distribution lines of respective ones of the powdered product, a distribution line of the liquid product, a distribution line for a chemical additive and a distribution line of the granulated product; said pre-mixer supplying said mixer/extruder device with a mixture of the powdered product and the liquid product.

3. The apparatus according to claim 1, wherein said hopper further comprises a nozzle for supplying the liquid product, engaged in an upper zone of the hopper to distribute said liquid product on the powdered product contained in the hopper and to make said mixture of the liquid product and the powdered product.

4. The apparatus according to claim 3, and further comprising a source for supplying said liquid product operatively connected with the injector or the nozzle; said liquid product being an oil.

5. The apparatus according to claim 2, and further comprising a plurality of the pre-mixer, each operatively connected with respective ones of the two distribution lines of the powdered products; said pre-mixers supplying said mixer/extruder with respective mixtures of the powdered products and oils.

6. The apparatus according to claim 2, wherein said distribution line of the liquid product supplies oil directly to the mixer/extruder and the distribution line of the granular product supplies sheared rubber directly to the mixer/extruder.

7. A process for mixing at least one chosen from granules, powders, and liquids in rubber production plants, comprising the steps of: providing: —a mixer/extruder device configured for production of a basic heterogeneous mixture; —a plurality of distribution lines operatively connected to said mixer/extruder device to supply the mixer/extruder device with at least one chosen from a powdered product, a granulated product, and a liquid product; —said mixer/extruder device configured for mixing the at least one chosen from the powdered product, the granulated product, and the liquid product to obtain said heterogeneous mixture; wherein at least one of the distribution lines carries the powdered product and includes a pre-mixer arranged upstream of said mixer/extruder device to mix said powdered product with the liquid product to form a mixture; wherein said pre-mixer comprises: —a hopper for containing the powdered product and including on an external surface of the hopper, a manifold defining a respective duct in fluid communication with an interior of the hopper; —a blower member operatively connected with the duct for delivering a mixing flow of the powdered product inside the hopper; said blower member comprising: a hollow element defining a duct to pass a flow of gas between an inlet section and an outlet section; a shutter contained in the hollow element and an actuator connected with the shutter to adjust a maximum stroke thereof, the actuator moving the shutter along a translation axis from a closed condition to a maximum opening position along a translation axis thereof; a lateral supply duct defining the inlet section and flowing into a chamber in a direction incident to the translation axis of the shutter; the shutter presenting a shape of a plunger comprising an elongated stem and a frustoconical head portion; a stop element, having at least one frustoconical internal stop surface arranged in opposition to the shutter; the at least one frustoconical internal stop surface being counter-shaped to the head portion of the shutter to define at least one hermetically sealing configuration of the outlet section; and an injector of said liquid product to supply the flow of gas with said liquid product and to make said mixture of liquid product and powder; the injector comprising an oil supply nozzle, engaged in an auxiliary duct of the hollow element extending from an opposite side of the lateral duct and in an incident direction to the translation axis of said shutter further including, upstream of the hopper, an injector of the liquid product to supply the mixing flow with the liquid product prior to entering the hopper to make the mixture of the powdered product and the liquid product; —distributing the at least one chosen from the powdered product, the granulated product, and the liquid product to an interior of the mixer/extruder device; —mixing the at least one chosen from the powdered product, the granulated product, and the liquid product in the mixer/extruder to obtain the basic heterogeneous mixture; pre-mixing the powdered product with the liquid product prior to the step of distributing the at least one chosen from the powdered product, the granulated product, and the liquid product to the interior of the mixer/extruder device.

8. The process according to claim 7, and further comprising a plurality of the pre-mixing step for supplying said mixer/extruder device with a series of mixtures of the powder product and the liquid product.

9. The process according to claim 7, wherein said pre-mixing step comprises the sub-steps of:
supplying a respective powdered product inside a hopper; and
delivering a mixing flow of the powdered product into the hopper.

10. The process according to claim 9, wherein said pre-mixing step further comprises the step of injecting the liquid product into the mixing flow.

11. The process according to claim 9, wherein said pre-mixing step further comprises the step of distributing said liquid product on the powdered product contained in the hopper.

12. The process according to claim 10, wherein said liquid product is an oil supplied to said hopper or to said mixing flow.

13. The process according to claim 7, wherein said step of distributing the at least one chosen from the powdered product, the granulated product, and the liquid product to the interior of the mixer/extruder device is carried out at least by feeding oil and sheared rubber directly to the mixer/extruder device.

\* \* \* \* \*